(12) United States Patent
Moffitt et al.

(10) Patent No.: US 6,896,339 B2
(45) Date of Patent: May 24, 2005

(54) METHODS AND SYSTEM FOR CONTROLLING LATCHING EXHAUST VALVES

(75) Inventors: Robert Lyn Moffitt, Palm Bay, FL (US); John P. Cooke, Indiatlantic, FL (US); Kelly Gatson Swartz, Indialantic, FL (US)

(73) Assignee: GE Harris Railway Electronics, LLC, Melbourne, FL (US)

( * ) Notice: Subject to any disclaimer, the term of this patent is extended or adjusted under 35 U.S.C. 154(b) by 0 days.

(21) Appl. No.: 10/387,744

(22) Filed: Mar. 12, 2003

(65) Prior Publication Data

US 2003/0218377 A1 Nov. 27, 2003

Related U.S. Application Data

(63) Continuation-in-part of application No. 09/661,354, filed on Sep. 14, 2000, now abandoned.

(51) Int. Cl.$^7$ .................................................. B60T 8/36
(52) U.S. Cl. ...................................... 303/119.2; 303/20
(58) Field of Search .......................... 303/119.2, 119.3, 303/70; 91/426, 459

(56) References Cited

U.S. PATENT DOCUMENTS

| | | | | |
|---|---|---|---|---|
| 5,370,449 A | * | 12/1994 | Edelen et al. .................. 303/3 |
| 5,429,424 A | * | 7/1995 | Huber et al. .................... 303/2 |
| 5,551,480 A | * | 9/1996 | Tomatsu et al. ......... 137/625.29 |
| 5,676,431 A | * | 10/1997 | McLaughlin et al. ......... 303/15 |
| 5,722,736 A | * | 3/1998 | Cook ........................... 303/15 |
| 5,735,579 A | * | 4/1998 | Wood et al. ................... 303/7 |
| 6,132,009 A | * | 10/2000 | Sich et al. ...................... 303/3 |
| 6,213,565 B1 | * | 4/2001 | Hart .............................. 303/7 |
| 6,276,761 B1 | * | 8/2001 | Beck ......................... 303/9.61 |
| 6,302,495 B1 | * | 10/2001 | Peltz ........................... 303/16 |
| 6,322,159 B1 | * | 11/2001 | Eberling ........................ 303/7 |
| 6,367,887 B1 | * | 4/2002 | Sulzyc ......................... 303/15 |

* cited by examiner

Primary Examiner—Robert A. Siconolfi
Assistant Examiner—Devon Kramer
(74) Attorney, Agent, or Firm—Armstrong Teasdale LLP

(57) ABSTRACT

A pneumatic braking method and system for a vehicle is provided. The system includes a brake cylinder, a reservoir, a latching exhaust valve (LEV) movable between an open position and closed position and fluidly connected between the reservoir and the brake cylinder. The LEV includes a first solenoid having a first pilot fluidly connected to the reservoir and a second solenoid having a second pilot fluidly connected to the reservoir wherein the pilots are configured to be controlled electronically and pneumatically, and are selectable between electronic and pneumatic control based on vehicle operating requirements. The solenoids are configured to be piloted with pneumatic pressure from the reservoir and an electronic controller that includes a release on failure circuit. The release on failure circuit is configured to control the LEV during at least one of a loss of power to the braking system and a failure of the electronic controller.

28 Claims, 7 Drawing Sheets

METHODS AND SYSTEM FOR CONTROLLING LATCHING EXHAUST VALVES

CROSS REFERENCE TO RELATED APPLICATIONS

This application is a continuation-in-part of U.S. patent application Ser. No. 09/661,354, filed Sep. 14, 2000 now abandoned.

BACKGROUND OF THE INVENTION

This invention relates generally to pneumatic braking systems and, more particularly to a latching exhaust valve (LEV) for a pneumatic braking system.

For over one hundred years, train braking has been accomplished pneumatically. Pure air braking operates in the following manner. Air brakes on each rail car in a train respond to air signals from a brake pipe running the length of the train. When an engineer operates a locomotive brake valve to stop or slow the train, air pressure is reduced along the brake pipe, causing a brake control valve in each rail car to release air from a reservoir to apply the car brake. When brake pipe air pressure is increased, the brake control valve causes the brake to be released and allows the air supply reservoir to be recharged with air.

Because time is required for brake pipe air to travel from one car to the next, pure air braking is slow and uneven over the length of the train. For example, it can take as long as 15 seconds for a brake pipe pressure change to travel the length of a train having 150 rail cars. For this reason, electronically controlled braking systems have been developed to provide for substantially uniform and simultaneous braking on all cars. However, often times exhaust valves utilized with electronically controlled braking systems operate pneumatically. In addition, sometimes braking is applied for extended periods of time, e.g., longer than one hour.

BRIEF SUMMARY OF THE INVENTION

In one aspect, a pneumatic braking system for a vehicle is provided. The system includes a brake cylinder, a reservoir, a latching exhaust valve (LEV) movable between an open position and closed position and fluidly connected between the reservoir and the brake cylinder. The LEV includes a first solenoid having a first pilot fluidly connected to the reservoir and a second solenoid having a second pilot fluidly connected to the reservoir wherein the pilots are configured to be controlled electronically and pneumatically, said selectable between electronic and pneumatic control based on the vehicle operating requirements. The solenoids are configured to be piloted with pneumatic pressure from the reservoir and an electronic controller that includes a release on failure circuit. The release on failure circuit is configured to control the LEV during at least one of a loss of power to the braking system and a failure of the electronic controller.

In another aspect, a method for providing braking control using a pneumatic system is provided. The system includes a brake cylinder, a reservoir of air under pressure, a latching exhaust valve (LEV) movable between an open position and a closed position including a first and a second solenoid, and an electronic controller that includes a release on failure circuit. The method includes fluidly connecting the LEV between the brake cylinder and the atmosphere with the LEV venting the brake cylinder to atmosphere when the LEV is in an open position and blocking flow to atmosphere when the LEV is in a closed position, piloting the LEV to selectively move the valve between the open position and the closed position, utilizing electronic control to pilot the LEV, utilizing pneumatic control to pilot the LEV, selecting the preferred form of control based on the vehicle operating requirements, maintaining the LEV in one of an opened position and a closed position, and controlling the LEV using the release on failure circuit during at least one of a loss of power and a failure of the electronic controller.

In yet another aspect, a release on failure circuit is provided for controlling a latching exhaust valve (LEV). The LEV is part of a pneumatic braking system including an electronic controller, a brake cylinder, and a reservoir. The release on failure circuit includes a complex programmable logic device (CPLD) configured to control operation of the LEV during at least one of a loss of power to the braking system and a failure of the electronic controller.

In a further aspect, a bi-stable, latching exhaust valve (LEV) for a pneumatic braking system for a vehicle is provided. The LEV is movable between an open and closed position and includes a first solenoid that includes a first pilot configured to be fluidly connected to a reservoir, and a second solenoid that includes a second pilot configured to be fluidly connected to the reservoir wherein the pilots are configured to be controlled electronically and pneumatically, and the control is selectable based on the vehicle operating requirements, and the solenoids are configured to be piloted with pneumatic pressure from the reservoir.

DETAILED DESCRIPTION OF THE INVENTION

Figure 1:
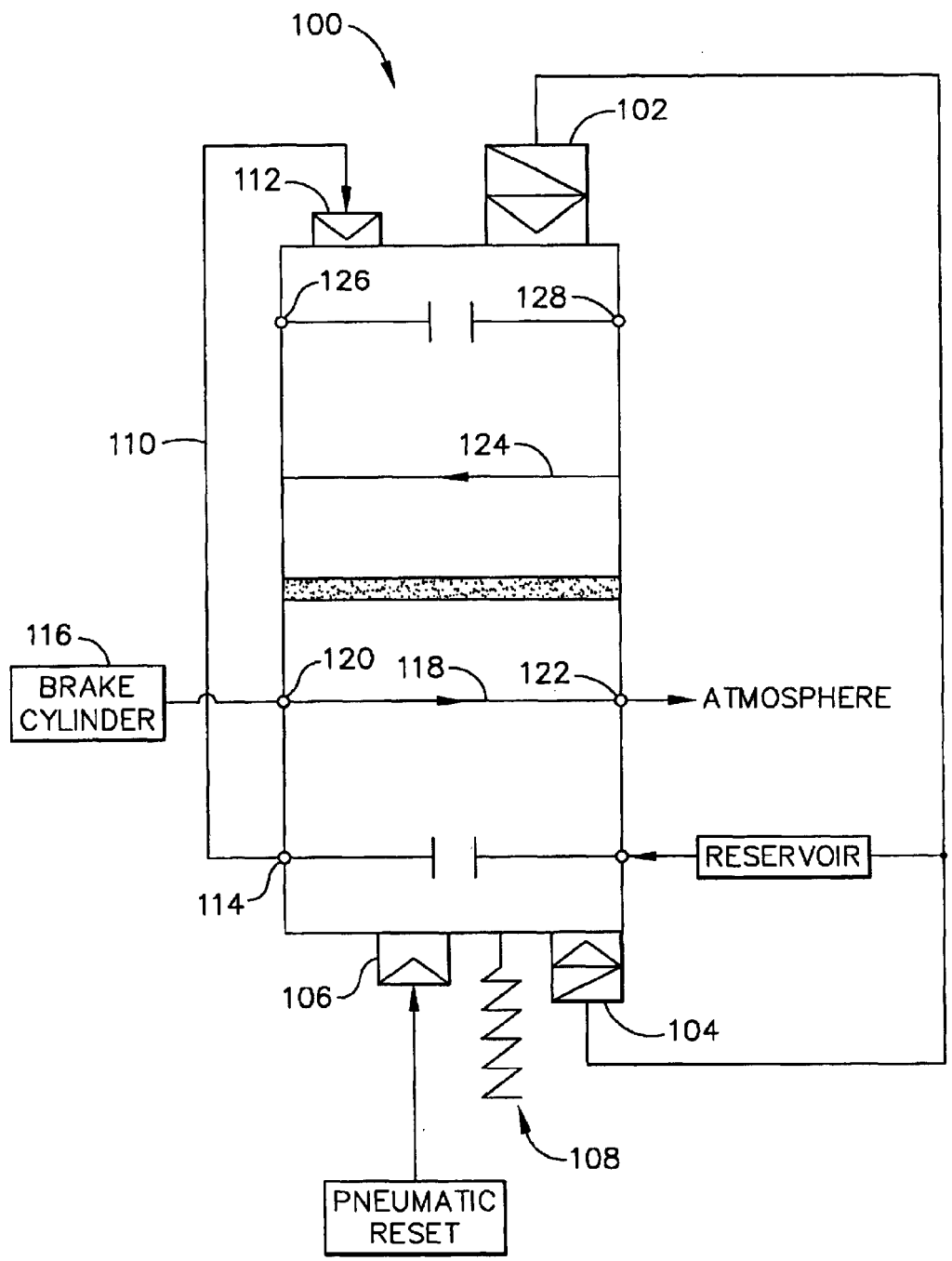
FIG. 1 is a schematic view of one embodiment of a latching exhaust valve (LEV) in an 'Open' state.
Figure 2:
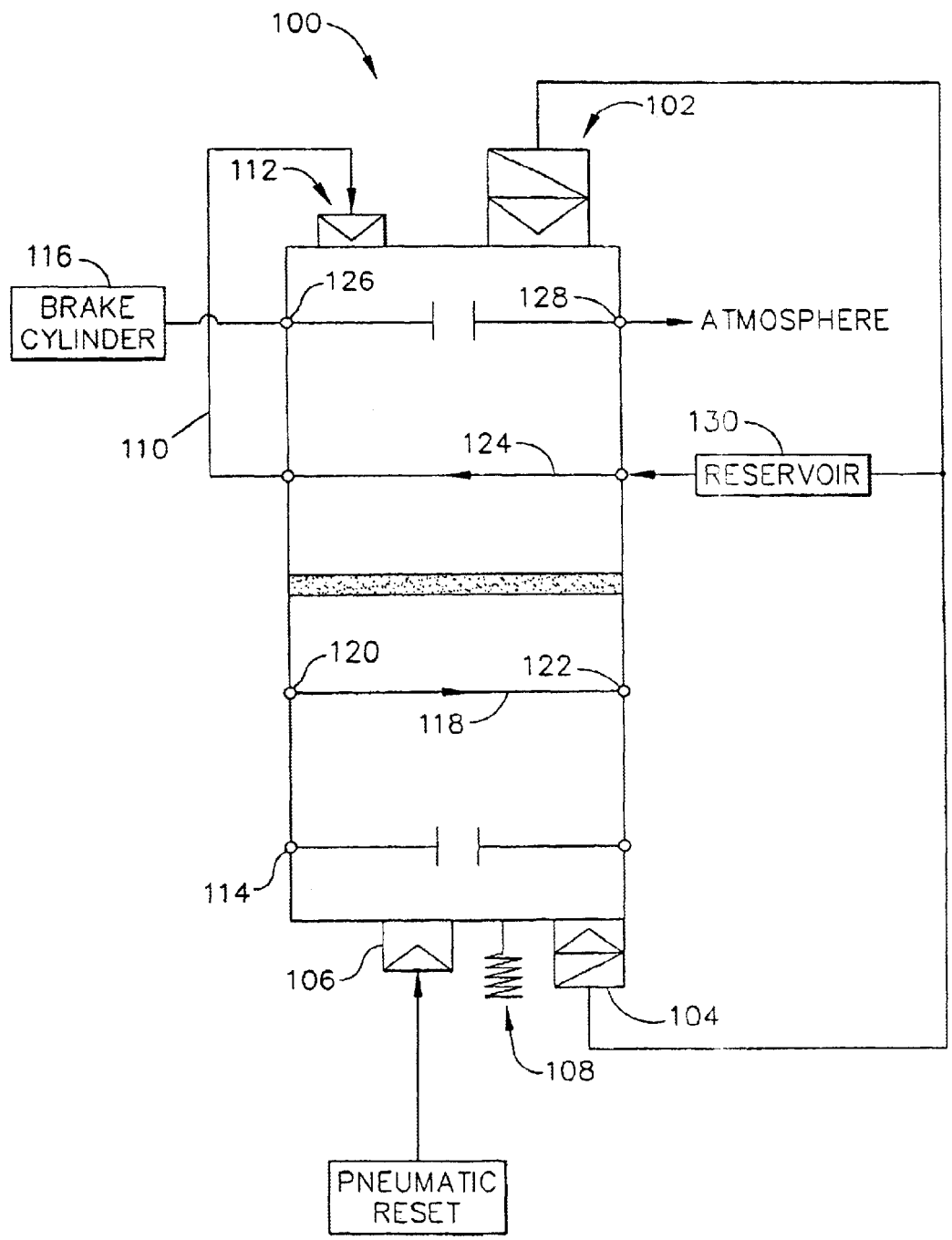
FIG. 2 is a schematic view of one embodiment of an LEV in a 'Closed' state.

FIG. 1 is a schematic view of one embodiment of a latching exhaust valve (LEV) 100 in an 'Open' state. LEV 100 includes a first solenoid valve 102, a second solenoid valve 104, and a pneumatic reset pilot 106. LEV 100 also includes a biasing member 108, a holding pressure pilot path 110, a pilot 112 and a circuit entrance 114. In one embodiment, biasing member 108 is a spring configured to hold LEV 100 in an 'Open' state when external piloting forces are absent. Each solenoid 102, 104 includes a pilot (not shown) that pilots solenoids 102 and 104 to actuate LEV 100 between the 'Open' state, as shown in FIG. 1, and the 'Closed' state, as shown in FIG. 2 and described below. In the 'Open' state, LEV 100 connects a brake cylinder 116 to the atmosphere via an air path 118 between a first contact point 120 and a second contact point 122.

FIG. 2 is a schematic view of one embodiment of LEV 100 in the 'Closed' state. Components in FIG. 2 identical to components in FIG. 1 are identified in FIG. 2 using the same reference numerals. In the 'Closed' state, LEV 100 connects brake cylinder 116 to a third contact point 126, the atmosphere is connected to a fourth contact point 128, and a compressed air reservoir 130 is connected to pilot 112, via an air path 124. Pressure pilot path 110 connects high pressure to pilot 112 thereby holding LEV 100 in a 'Closed' state, such that a desired brake application is maintained.

Figure 3:
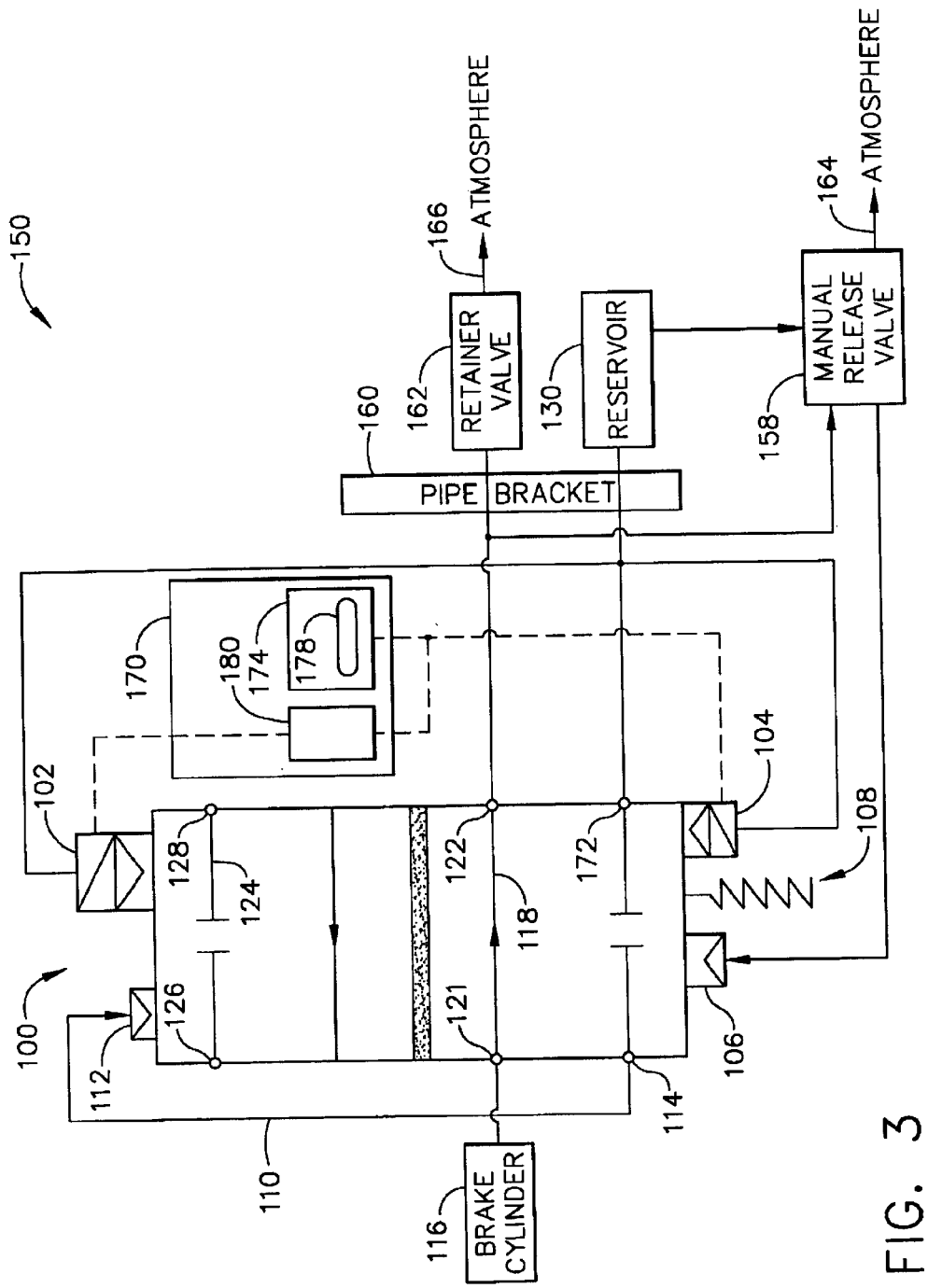
FIG. 3 is a schematic view of one embodiment of a pneumatic braking system.

FIG. 3 is a schematic view of one embodiment of a pneumatic braking system 150 including an exhaust valve, such as LEV 100 (shown in FIG. 1). Components in system 150 identical to components of LEV 100 are identified in FIG. 3 using the same reference numerals as used in FIG. 1. In one embodiment, LEV 100 is a bi-stable LEV for pneumatic braking system 150. Furthermore, in one embodiment braking system 150 is a train braking system. In an alternative embodiment, braking system 150 is a truck braking system. In a further alternative embodiment, braking system 150 is an aircraft braking system. System 150 includes brake cylinder 116 fluidly connected to LEV 100, a reservoir 130, a manual release valve 158 connected to LEV 100 through a pipe bracket 160, and a retainer valve 162 fluidly connected to manual release valve 158. Manual release valve 158 includes an outlet 164 to the atmosphere. Additionally, retainer valve 162 includes an outlet 166 to the atmosphere. Outlets 164 and 166 provide an exhaust pathway for releasing air from system 150 to the atmosphere. In one embodiment, system 150 also includes an electronic controller 170, which controls LEV 100 by controlling the actuation of solenoid valves 102 and 104.

When LEV 100 moves from the 'Open' state (shown in FIG. 1) to the 'Closed' state (shown in FIG. 2), electronic controller 170 actuates solenoid valve 102 causing reservoir 130 to provide compressed air pressure to LEV 100. The compressed air pressure causes LEV 100 to move to the 'Closed' state. In the 'Closed' state brake cylinder 116 is connected to contact point 126, and reservoir 130 is fluidly connected to pilot 112, via air path 124. In the 'Closed' state, LEV 100 prevents air flow from brake cylinder 116 to the atmosphere, and air pressure from reservoir 130 is provided to pilot 112, via air path 124, thereby holding LEV 100 in the 'Closed' state.

In one embodiment, LEV 100 moves from the 'Closed' state to the 'Open' state via application of a pneumatic reset signal to pilot 106. In another embodiment, electronic controller 170 applies an electrical voltage to solenoid valve 104, thereby causing LEV 100 to move from the 'Closed' state to the 'Open' state. More specifically, and in one embodiment, when electronic controller 170 applies a voltage to solenoid valve 104, reservoir 130 provides compressed air pressure to LEV 100 causing LEV 100 to move from the 'Closed' state to the 'Open' state. In the 'Open' state brake cylinder 116 is fluidly connected to the atmosphere, via air path 118, and reservoir 130 is connected to a contact point 172. In the 'Open' state, LEV 100 allows airflow from brake cylinder 116 to the atmosphere and prevents airflow from reservoir 130 to pilot 112, and spring 108 holds LEV 100 in the 'Open' state.

In one embodiment, electronic controller 170 receives brake commands via changes in pressure in a brake pipe (not shown). In another embodiment, electronic controller 170 receives brake commands via radio signals transmitted from a control unit (not shown) at a remote location.

Manual release valve 158 is fluidly connected to pneumatic reset 106 such that upon actuation of manual release valve 158, compressed air pressure from reservoir 130 is applied to pneumatic reset 106 causing LEV 100 to reset to the 'Open' state.

In an alternative embodiment, electronic controller 170 includes a release on failure circuit 174. Release on failure circuit 174 includes a capacitor to store power (not shown), a complex programmable logic device (CPLD) 178, such as a field programmable gate array (FGPA), and a normal exhaust control circuit 180 that controls the exhausting of pneumatic pressure of brake cylinder 116 during a brake release. Exhaust control circuit 180 is embedded within controller 170 as shown in FIG. 3. CPLD 178 is programmed to monitor status bits of electronic controller 170, monitor power to system 150, and provide an actuation pulse to the LEV 100 to release the brakes in the event of an unexpected failure condition, for example a failure of electronic controller 170 or an unexpected/undesired loss of power to system 150. A capacitor provides power to CPLD 178 in the event of loss of power to system 150, and provides the power necessary to actuate solenoid valves 102 and 104. In one embodiment, LEV 100 can hold or release a brake application with a single, momentary activation of solenoid valves 102 and 104.

CPLD 178 is a general purpose, multi-level programmable logic device customizable by end users. Internally, CPLD 178 consists of arrays of programmable logic blocks (not shown) embedded in a programmable interconnect structure allowing a user to customize the device in the field. In the event that CPLD 178 detects failure of electronic controller 170 based on the status bits or CPLD 178 detects an unexpected/undesired power loss to electronic controller 170, CPLD 178 is programmed to actuate solenoid valve 104 such that air pressure in brake cylinder 116 is exhausted to the atmosphere, via air path 118, thereby releasing a brake application. More, specifically, and for example, CPLD 178 is programmed such that if power is lost to electronic controller 170 and the air pressure in system 150 is above a specific threshold, i.e., an unexpected/undesired power loss, release on failure circuit 174 operates LEV 100 so that air is exhausted from brake cylinder 116. Conversely, under normal power loss conditions, for example when power to electronic controller 170 is shut down in a planned orderly fashion, CPLD 178 is programmed to maintain LEV 100, such that brake pressure will be maintained during the normal power loss condition. More specifically, and for example, CPLD 178 is programmed such that if power is lost to electronic controller 170 and the air pressure in system 150 is below a specific threshold, i.e., a normal power loss condition, release on failure circuit 174 operates LEV 100 to maintain air pressure in brake cylinder 116.

Figure 4:
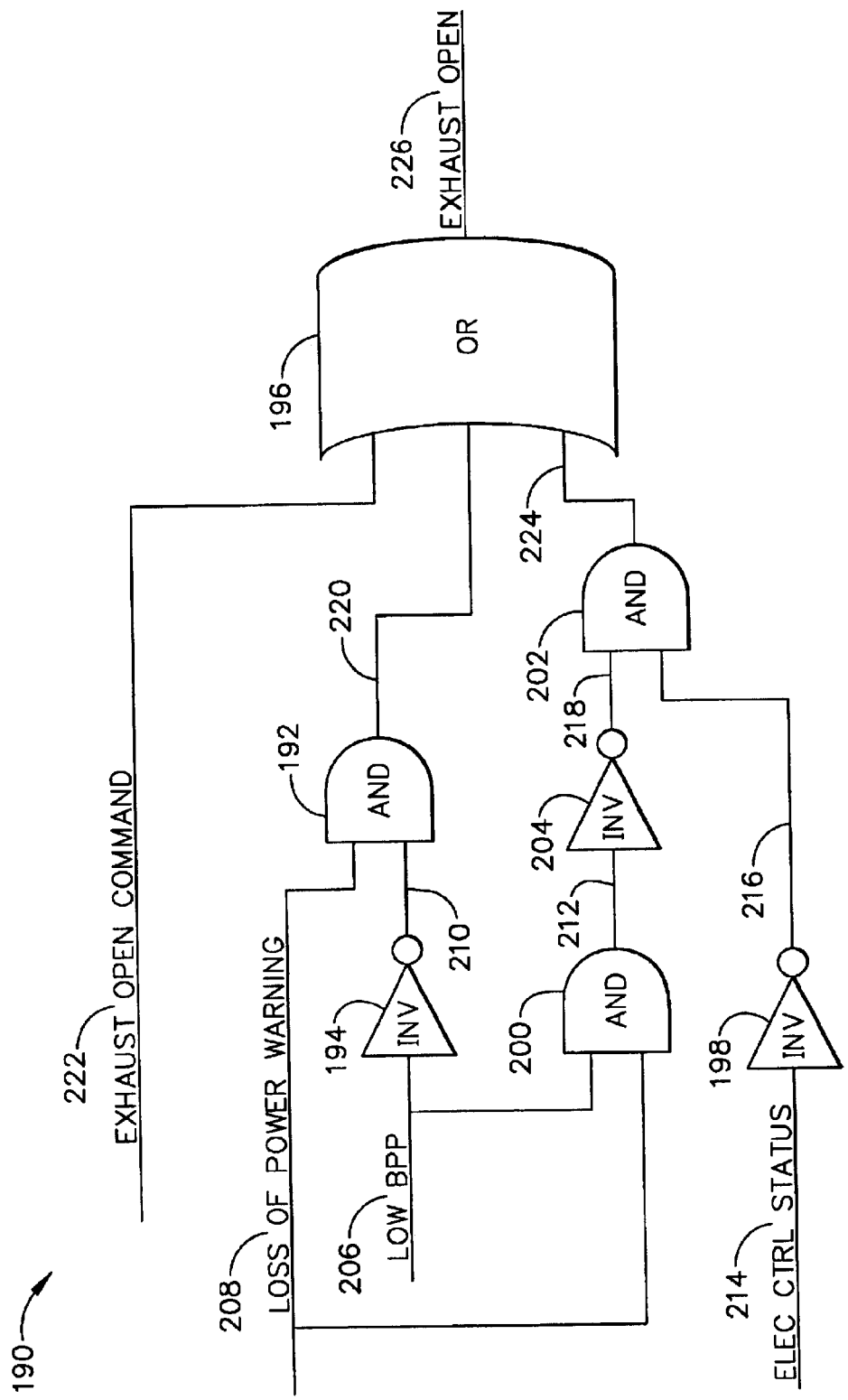
FIG. 4 is a logic diagram of one embodiment of logic contained in a complex programmable logic device (CPLD) for a pneumatic braking system.

FIG. 4 is a logic diagram 190 of one embodiment of logic contained in CPLD 178 (shown in FIG. 3). In one embodiment, logic diagram 190 applies to a braking system having a pneumatic power unit that converts air pressure in a brake pipe (not shown) to electrical power for use by electronic controller 170 (shown in FIG. 3). Logic diagram 190 includes an 'AND' gate 192, a first inverter 194, an 'OR' gate 196, a second inverter 198, an 'AND' gate 200, an 'AND' gate 202, and a third inverter 204. First inverter 194 has as an input a 'brake pipe pressure low' signal 206. 'AND' gate 192 has as inputs a 'loss of power warning' signal 208 and an output signal 210 of inverter 194. 'AND' gate 200 has as inputs 'brake pipe pressure low' signal 206 and 'loss of power warning' signal 208. Third inverter 204 has as an input an output signal 212 of 'AND' gate 200. Second inverter 198 has as an input an 'electronic controller status' signal 214. 'AND' gate 202 has as inputs an output signal 216 of second inverter 198 and an output signal 218 of third inverter 204. 'OR' gate 196 has as inputs an output signal 220 of 'AND' gate 192, an 'exhaust open command' signal 222, and an output signal 224 of 'AND' gate 202. The state of normal exhaust control circuit 180 (shown in FIG. 3) determines the status of 'exhaust open command' signal 222. 'OR' gate 196 outputs an 'exhaust open' signal 226, which determines an output of CPLD 178. Based on the output of CPLD 178, electronic controller 170 (shown in FIG. 3) controls LEV 100 (shown in FIG. 1).

Table 1, below, is a truth table for logic diagram 190.

TABLE 1

| 222 Exhaust Open Cmnd (1 = open) (0 = no cmnd) | 208 Loss of Power Warning (1 = warning) (0 = no warning) | 206 Low BPP (1 = low BPP) (0 = BPP OK) | 214 Elect Ctrl Status (1 = good) (0 = bad) | 220 | 212 | 218 | 216 | 224 | 226 Exhaust Open |
|---|---|---|---|---|---|---|---|---|---|
| 1 | X | X | X | X | X | X | X | X | 1 |
| 0 | 0 | 0 | 0 | 0 | 0 | 1 | 1 | 1 | 1 |
| 0 | 0 | 0 | 1 | 0 | 0 | 1 | 0 | 0 | 0 |
| 0 | 0 | 1 | 0 | 0 | 0 | 1 | 1 | 1 | 1 |
| 0 | 0 | 1 | 1 | 0 | 0 | 1 | 0 | 0 | 0 |
| 0 | 1 | 0 | 0 | 1 | 0 | 1 | 1 | 1 | 1 |
| 0 | 1 | 0 | 1 | 1 | 0 | 1 | 0 | 0 | 1 |
| 0 | 1 | 1 | 0 | 0 | 1 | 0 | 1 | 0 | 0 |
| 0 | 1 | 1 | 1 | 0 | 1 | 0 | 0 | 0 | 0 |

Referring to FIG. 4 and Table 1, if either signal 220, 222, or signal 224 is a logic 1, then the output of 'OR' gate 196, exhaust open signal 226, will be high and CPLD 178 will cause electronic controller 170 to actuate solenoid valve 104 such that air pressure in brake cylinder 116 is released. If loss of power warning 208 and output signal 210 are both at logic 1, then 'AND' gate 192 output 220 will be a logic 1, thereby indicating a loss of power is about to occur while brake pipe pressure is still at an acceptable level. A loss of power warning while brake pipe pressure is at an acceptable level indicates a power unit fault, which results in a release of any existing braking application. If Electronic Controller Status is bad, or the system has had an unexpected loss of power, input signal 214 will be low (logic 0), output signal 216 will be high (logic 1). If power is not shutting down due to low BPP, signal 218 will be a logic 1. In this case, output signals 224 and 226 will be high, and will cause LEV 100 to open and thus release air pressure in brake cylinder 116. Therefore, when system 150 (shown in FIG. 3) incurs an unexpected system failure, CPLD 178 actuates LEV 100 such that air is exhausted from brake cylinder 116. Conversely, when system 150 incurs a orderly, anticipated power shutdown, CPLD 178 allows any existing brake application to remain in effect.

Figure 5:
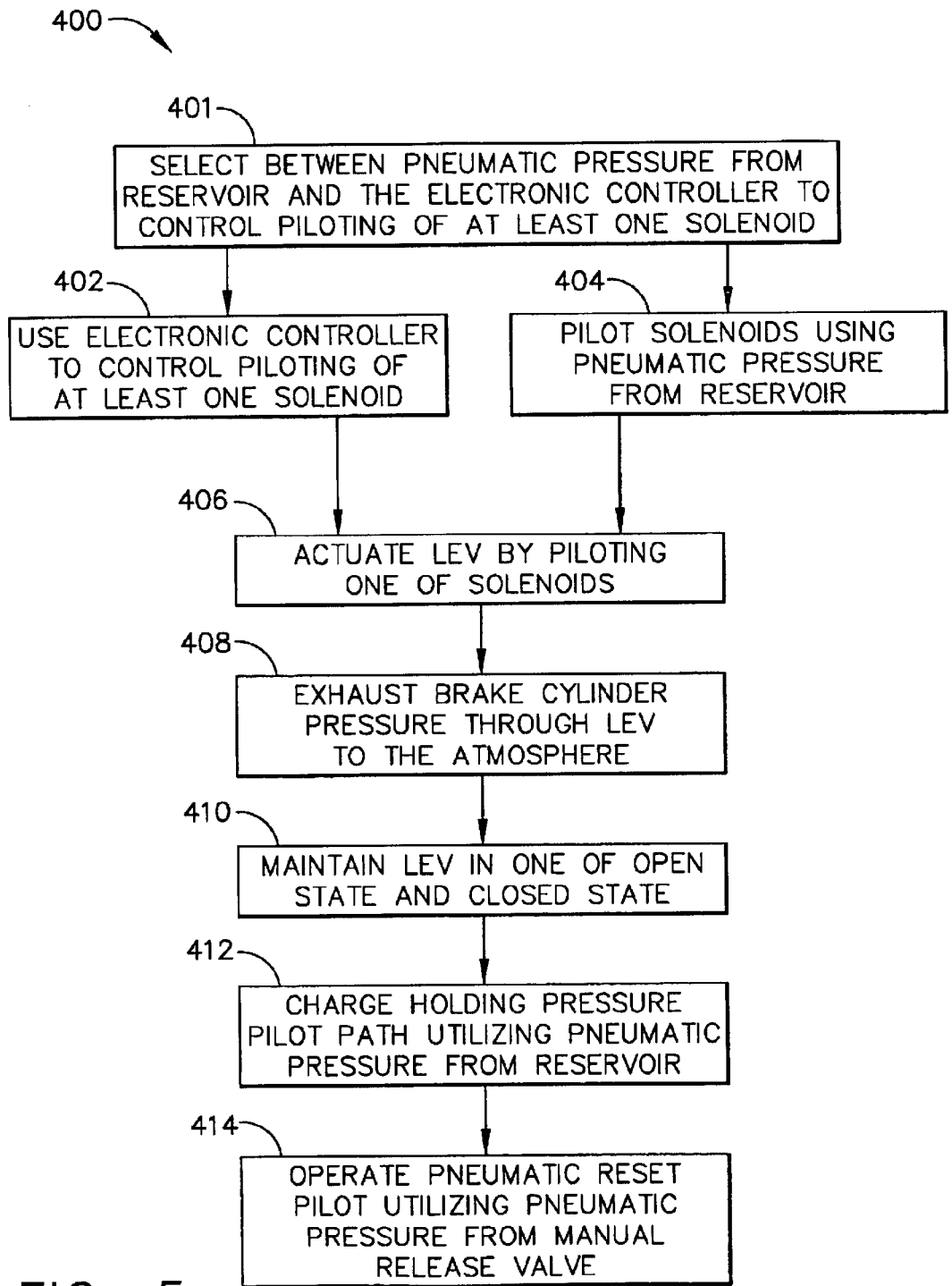
FIG. 5 is a flowchart illustrating one embodiment of a method for actuating an LEV in response to stimuli affecting a pneumatic system.

FIG. 5 is a flowchart illustrating one embodiment of a method 400 for actuating an exhaust valve, such as LEV 100 (shown in FIG. 1), in response to a stimuli, such as a change of pressure in a brake pipe or radio command signal (not shown), and thus affecting a pneumatic system, such as system 150 (shown in FIG. 2). Method 400 includes using 402 electronic controller 170 (shown in FIG. 3) to control piloting of at least one of solenoids 102 and 104 (shown in FIGS. 1 and 2) in response to the stimuli. In one embodiment, electronic controller 170 is a processor programmed to control the piloting of solenoids 102 and 104. For example, if electronic controller 170 determines a normal reduction in pneumatic pressure in the brake pipe, electronic controller 170 pilots one of solenoids 102, 104, e.g., a set solenoid such as solenoid 102, so that set solenoid 102 actuates LEV 100 from the 'Open' state (shown in FIG. 1) to the 'Closed' state (shown in FIG. 2). If, however, electronic controller 170 determines an unusual pressure drop, such as in an emergency event, electronic controller 170 pilots one of solenoids 102, 104, e.g., a reset solenoid such as solenoid 104, so that reset solenoid 104 actuates LEV 100 from the 'Closed' state (shown in FIG. 2) to the 'Open' state (shown in FIG. 1).

Method 400 also includes piloting 404 solenoids 102 and 104 using pneumatic pressure from reservoir 130. In one embodiment, the pneumatic pressure utilized to pilot solenoids 102 and 104, and hence actuate LEV 100, is separate and distinct from the pneumatic pressure contained within the brake pipe, i.e., LEV 100 does not communicate with the brake pipe circuit. Alternatively, the pneumatic pressure utilized to pilot solenoids 102 and 104 is obtained, at least partially, from the pressure contained within the brake pipe.

Method 400 further includes actuating 406 LEV 100 by piloting one of solenoids 102 and 104. In one embodiment, LEV 100 is actuated from the 'Closed' state to the 'Open' state. In another embodiment, LEV 100 is actuated from the 'Open' state to the 'Closed' state. Additionally, in one embodiment, solenoids 102 and 104 are configured to be piloted using pneumatic pressure from reservoir 130, and are configured to be piloted using controller 170. Furthermore, in one embodiment, selection 401 between piloting of solenoids 102 and 104 using pneumatic pressure from reservoir 130 or piloting of solenoids 102 and 104 using controller 170 is determined based on operating requirements of a vehicle using braking system 150 (shown in FIG. 3). Since brake cylinder 116 is fluidly connected to LEV 100 at contact point 116 and LEV 100 includes contact point 120 which is an exhaust to the atmosphere, when valve 100 is actuated to the 'Open' state, passageway 118 extends between contact points 120 and 122 and system 150 exhausts 408 brake cylinder pressure through LEV 100 to the atmosphere.

Method 400 also includes maintaining 410 LEV 100 in one of the 'Open' state and the 'Closed' state. In one embodiment, LEV 100 is a bi-stable, latching LEV configured to remain in the 'Open' state if LEV 100 is actuated to the 'Open' state and configured to remain in the 'Closed' state if LEV 100 is actuated to the 'Closed' state.

Method 400 further includes charging 412 holding pressure pilot path 110 utilizing pneumatic pressure from reservoir 130. Reservoir 130 is fluidly connected to holding pressure pilot path 110 which is utilized to provide additional support to maintain LEV 100 in its present state, i.e., the 'Open' state or the 'Closed' state.

In addition, method 400 includes operating 414 pneumatic reset pilot 106 utilizing pneumatic pressure from manual release valve 158. In one embodiment, manual release valve 158 is fluidly connected between reservoir 130 and pneumatic reset pilot 106. Upon actuation of manual release valve 158, pressure is directed from reservoir 130 through manual release valve 158 to pneumatic reset pilot 106. Once the additional pressure reaches pneumatic reset pilot 106, manual release reset 106 resets LEV 100 from the 'Closed' state to the 'Open' state.

Figure 6:
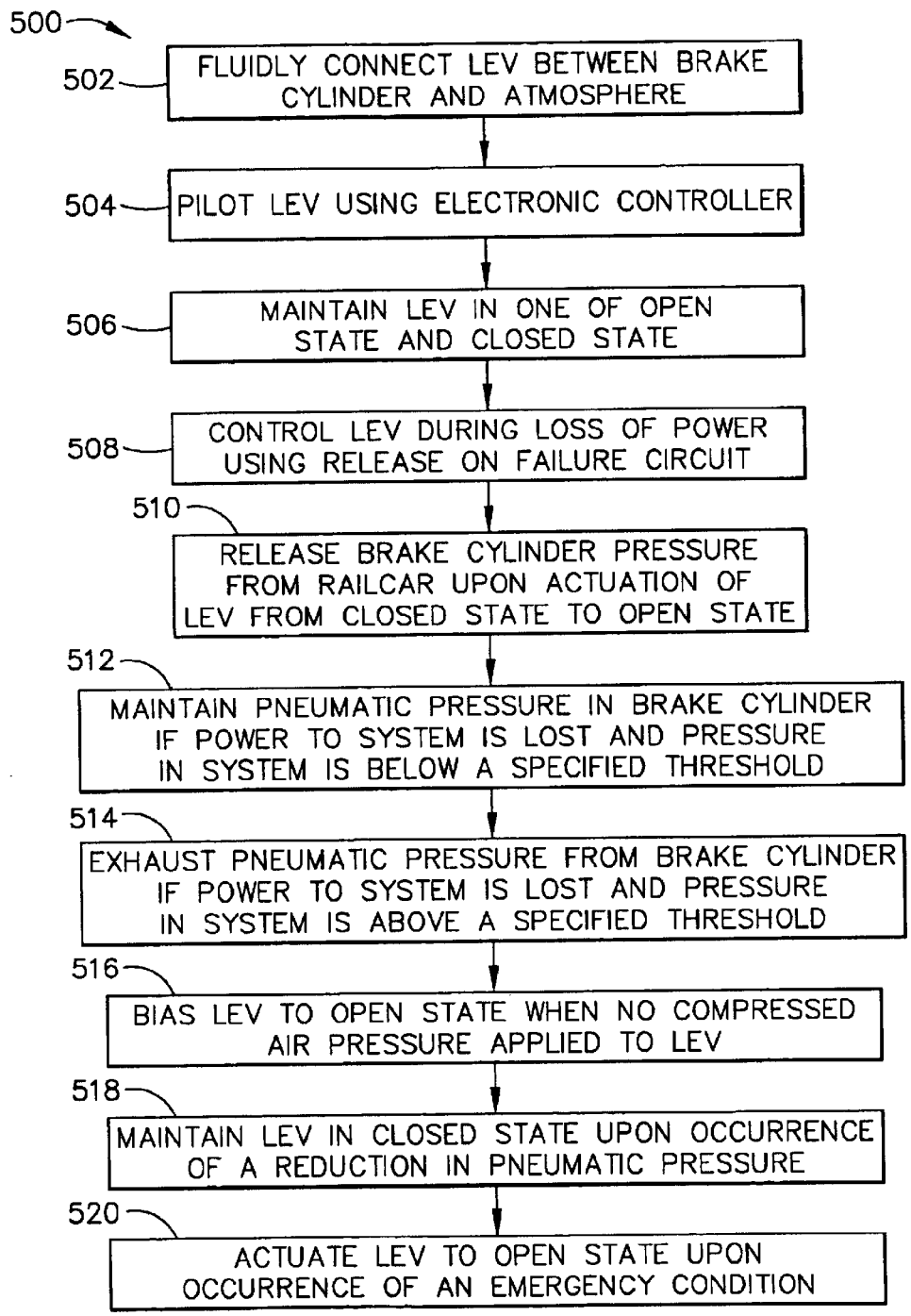
FIG. 6 is a flowchart illustrating one embodiment of a method for providing braking control using a pneumatic braking system.

FIG. 6 is a flowchart illustrating one embodiment of a method 500 for providing braking control using pneumatic braking system 150 (shown in FIG. 3). Method 500 includes fluidly connecting 502 LEV 100 (shown in FIGS. 1, 2, and 3) between brake cylinder 116 (shown in FIGS. 1, 2, and 3) and the atmosphere, and piloting 504 LEV 100 using electronic controller 170 (shown in FIG. 3). Method 500 further includes maintaining 506 LEV 100 in one of the 'Open' state (shown in FIG. 1) and the 'Closed' state (shown in FIG. 2), and controlling 508 LEV 100 during a loss of power using release on failure circuit 174 (shown in FIG. 3). More specifically, in one embodiment wherein pneumatic braking system 150 is a railcar braking system, method 500 includes releasing 510 brake cylinder 116 pressure from a railcar upon actuation of LEV 100 from the 'Closed' state to the 'Open' state. Furthermore, and more specifically, in one embodiment controlling 508 LEV 100 during a loss of power using release on failure circuit 174 includes using CPLD 178 (shown in FIG. 3) such that LEV 100 maintains 512 pneumatic pressure in brake cylinder 116 if power to system 150 is lost and the pressure in system 150 is below a specified threshold. In addition, and more specifically, in one embodiment controlling 508 LEV 100 during a loss of power using release on failure circuit 174 includes using CPLD 178 such that LEV 100 exhausts 514 pneumatic pressure from brake cylinder 116 if power to system 150 is lost and the pressure in system 150 is above a specified threshold. In some embodiments, method 500 includes at least one of biasing 516 LEV 100 to the 'Open' state when no compressed air pressure is applied to LEV 100, and maintaining 518 LEV 100 in the 'Closed' state after actuation of solenoid pilot valve 102.

Figure 7:
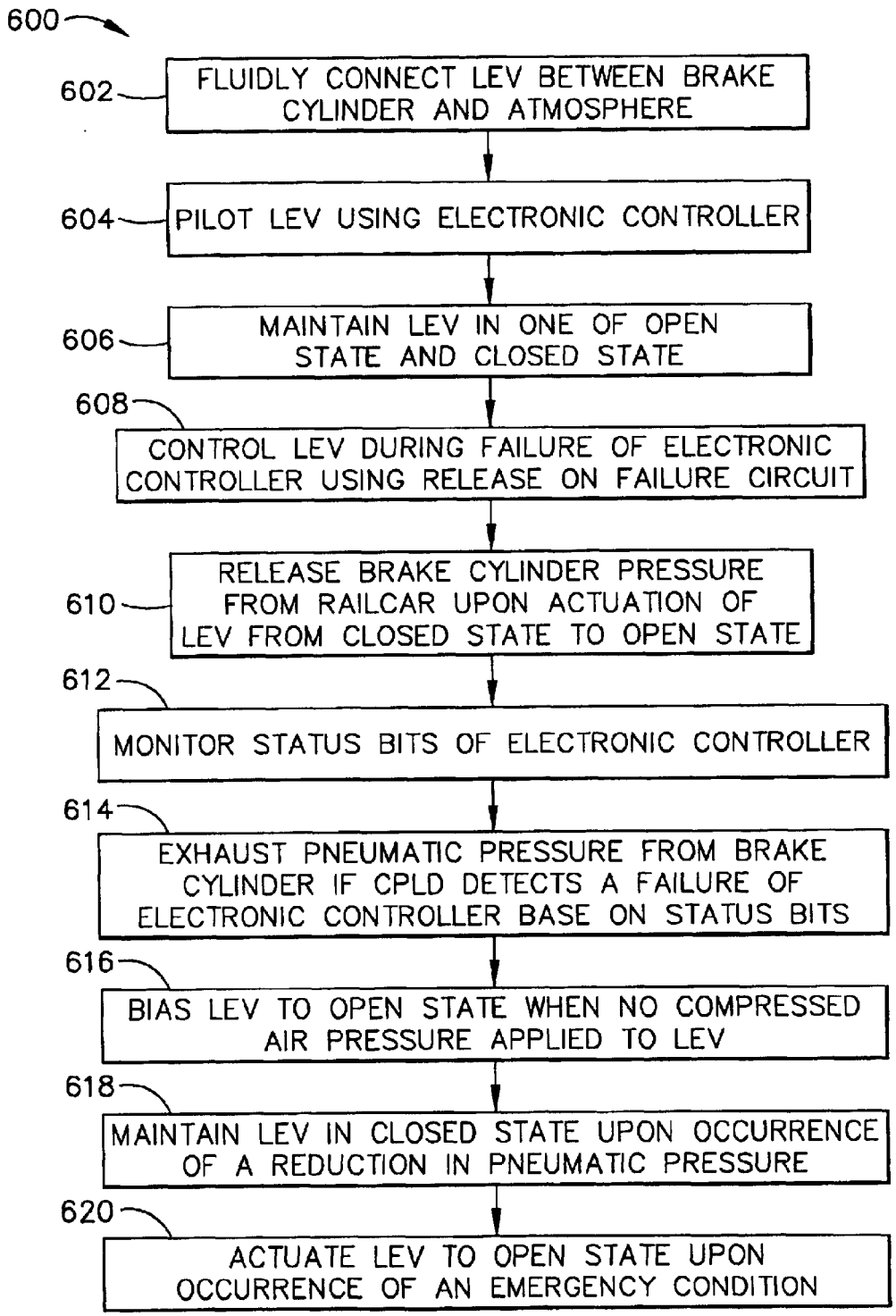
FIG. 7 is a flowchart illustrating one embodiment of a method for providing braking control using a pneumatic braking system.

FIG. 7 is a flowchart illustrating one embodiment of a method 600 for providing braking control using pneumatic braking system 150 (shown in FIG. 3). Method 600 includes fluidly connecting 602 LEV 100 (shown in FIGS. 1, 2, and 3) between brake cylinder 116 (shown in FIGS. 1, 2, and 3) and the atmosphere, and piloting 604 LEV 100 using electronic controller 170 (shown in FIG. 3). Method 600 further includes maintaining 606 LEV 100 in one of the 'Open' state (shown in FIG. 1) and the 'Closed' state (shown in FIG. 2), and controlling 608 LEV 100 during failure of electronic controller 170 using release on failure circuit 174 (shown in FIG. 3). More specifically, in one embodiment wherein pneumatic braking system 150 is a railcar braking system, method 500 includes releasing 610 brake cylinder 116 pressure from a railcar upon actuation of LEV 100 from the 'Closed' state to the 'Open' state. Furthermore, and more specifically, in one embodiment controlling 608 LEV 100 during a failure of electronic controller 170 using release on failure circuit 174 includes using CPLD 178 (shown in FIG. 3) to monitor 612 status bits of electronic controller 170, and using CPLD 178 such that LEV exhausts 614 pneumatic pressure from brake cylinder 116 if CPLD 178 detects a failure of electronic controller 170 based on the status bits. In some embodiments, method 600 includes at least one of biasing 616 LEV 100 to the 'Open' state when no compressed air pressure is applied to LEV 100, and maintaining 618 LEV 100 in the 'Closed' state after actuation of solenoid pilot valve 102.

A pneumatic braking system 150 is described that includes an LEV 100 and an electronic controller 170. Controller 170 includes a release on failure circuit 174 that monitors the performance of electronic controller 170 and releases the brakes of braking system 150 in the event of an unexpected failure condition. Release on failure circuit 174 includes a CPLD 178 that is programmed to monitor status bits from the electronic controller, monitor system power, and provide an actuation pulse to the LEV to release the brakes in the event of the unexpected failure condition. For example, if an unexpected/undesired loss of power occurs, or a failure of electronic controller 170 occurs, CPLD 178 is programmed to activate LEV 100 solenoids such that LEV 100 causes a release of a braking application. Conversely, under normal power loss conditions CPLD 178 is programmed to maintain a braking application during the normal power loss condition.

While the invention has been described in terms of various specific embodiments, those skilled in the art will recognize that the invention can be practiced with modification within the spirit and scope of the claims.

What is claimed is:

1. A pneumatic braking system for a vehicle comprising:
a brake cylinder;
a reservoir;
a brake pipe;
a latching exhaust valve (LEV) movable between an open state and a closed state fluidly connected between the reservoir and the brake cylinder, said LEV comprising a first solenoid comprising a first pilot fluidly connected to said reservoir and a second solenoid comprising a second pilot fluidly connected to said reservoir; said pilots configured to be controlled electronically, said pilots configured to be controlled pneumatically, the electronic or pneumatic control being selectable based on vehicle operating requirements, said solenoids configured to be piloted with pneumatic pressure from said reservoir; and
an electronic controller comprising a release on failure circuit, said release on failure circuit comprising a complex programmable logic device (CPLD) configured to control said LEV during at least one of a loss of power to said braking system and a failure of said electronic controller, said release on failure circuit further configured to control said LEV such that pneumatic pressure in said brake cylinder is maintained if power to said system is lost and the pneumatic pressure in said brake pipe is below a specified threshold, said release on failure circuit further configured to control said LEV such that pneumatic pressure from said brake cylinder is exhausted if power to said system is lost and the pneumatic pressure in said brake pipe is above a specified threshold.

2. A system in accordance with claim 1 wherein said LEV comprises a biasing member configured to bias said LEV to an open state when no external forces act on said LEV.

3. A system in accordance with claim 1 wherein said LEV configured to be maintained in a closed state during a braking application.

4. A system in accordance with claim 1 wherein said pneumatic braking system comprises a rail car pneumatic braking system.

5. A system in accordance with claim 1 wherein said release on failure circuit comprises the complex programmable logic device (CPLD) configured to monitor status bits of said electronic controller and exhaust pneumatic pressure from said brake cylinder if said CPLD detects a failure of said electronic controller based on the status bits.

6. A system in accordance with claim 1 wherein said LEV further comprises a manual vent reset configured to actuate said LEV to release pneumatic pressure from said brake cylinder to the atmosphere.

7. A system in accordance with claim 6 further comprising a manual vent valve, said manual vent valve fluidly connected to said manual vent reset.

8. A system in accordance with claim 1 wherein said LEV further comprises a holding pressure circuit fluidly connected to the reservoir.

9. A system in accordance with claim 1 wherein said LEV is configured to exhaust pneumatic pressure from said brake cylinder to the atmosphere upon actuation of said LEV from a closed state to an open state.

10. A system in accordance with claim 1 wherein said LEV is configured to be maintained in the closed state upon the occurrence of a reduction in pneumatic pressure in said system.

11. A system in accordance with claim 1 wherein said LEV is configured to be actuated to an opened state upon the occurrence of an emergency event.

12. A system in accordance with claim 1 wherein said pneumatic braking system comprises a rail car pneumatic braking system.

13. A system in accordance with claim 1 further comprising a processor, said LEV pilots configured to be controlled by said processor.

14. A method for providing braking control using a pneumatic system including a brake cylinder, a reservoir of air under pressure, a latching exhaust valve (LEV) movable between an open position and a closed position including a first and a second solenoid, and an electronic controller, the electronic controller including a release on failure circuit the release on failure circuit comprising a complex programable logic device (CPLD), said method compnsing:

fluidly connecting the LEV between the brake cylinder and the atmosphere with the LEV venting the brake cylinder to atmosphere when the LEV is in an open position and blocking flow to atmosphere when the LEV is in a closed position;

piloting the LEV to selectively move the valve between the open position and the closed position;

utilizing electronic control to pilot the LEV;

utilizing pneumatic control to pilot the LEV;

selecting the preferred form of control based on vehicle operating requirements;

maintaining the LEV in one of an opened position and a closed position; and controlling the LEV using the release on failure circuit during at least one of a loss of power and a failure of the electronic controller by maintaining pneumatic pressure in the brake cylinder if power to the system is lost and the pressure in the system is below a specified threshold.

15. A method in accordance with claim 14 wherein the LEV is a bi-stable exhaust valve, said step of maintaining the LEV comprises the step of maintaining the LEV in the open position.

16. A method in accordance with claim 14 Wherein the LEV is a bi-stable exhaust valve, said step of maintaining the LEV comprises the step of maintaining the LEV in the closed position.

17. A method in accordance with claim 14 wherein the LEV is a bi-stable LEV including at least one solenoid, said method comprising piloting the at least one solenoid using pneumatic pressure from the reservoir.

18. A method in accordance with claim 17 further comprising controlling the solenoids electronically.

19. A method in accordance with claim 14 further comprising biasing the LEV to the opened position when no pressure is applied to the LEV.

20. A method in accordance with claim 14 wherein the LEV includes a manual vent reset, said method further comprising the step of operating the manual vent reset utilizing pneumatic pressure from a manual vent valve.

21. A method in accordance with claim 14 wherein the LEV includes a holding pressure circuit, said method comprising the step of supplying pneumatic pressure to the holding pressure circuit from the reservoir.

22. A method in accordance with claim 14 wherein the LEV includes a solenoid, said method further comprising the step of releasing brake cylinder pressure by piloting the solenoid.

23. A method in accordance with claim 14 further comprising maintaining the LEV in the closed state upon the occurrence of a reduction in pneumatic pressure.

24. A method in accordance with claim 14 further comprising actuating the LEV to the opened position upon the occurrence of an emergency condition.

25. A method in accordance with claim 14 wherein said step of piloting the LEV comprises the step of utilizing a processor to pilot the LEV.

26. A method in accordance with claim 14 wherein the pneumatic system is a railcar braking system, said method further comprising releasing brake cylinder pressure from the railcar upon the actuation of the LEV from the closed position to the opened position.

27. A method in accordance with claim 14 wherein said controlling the LEV during a loss of power further comprises using the CPLD such that the LEV during a loss of power further comprises using a complex programmable logic device (CPLD).

28. A method in accordance with claim 14 wherein the release on failure circuit includes a complex programmable logic device (CPLD), said controlling the LEV during failure of the electronic controller comprising:

using the CPLD to monitor status bits of the electronic controller; and using the CPLD such that the LEV exhausts pneumatic pressure from the brake cylinder if the CPLD detects a failure of the electronic controller based on the status bits.

* * * * *

UNITED STATES PATENT AND TRADEMARK OFFICE
CERTIFICATE OF CORRECTION

PATENT NO. : 6,896,339 B2
DATED : May 24, 2005
INVENTOR(S) : Moffit et al.

It is certified that error appears in the above-identified patent and that said Letters Patent is hereby corrected as shown below:

Column 9,
Line 39, delete "compnsing" and insert therefor -- comprising --.

Column 10,
Line 45, delete "using the CPLD such that the LEV during a loss of power further comprises using a complex programmable logic device (CPLD)." and insert therefor -- using a complex programmable logic device (CPLD) such that the LEV exhausts pneumatic pressure from the brake cylinder if power to the system is lost and the pressure in the system is above a specified threshold. --.

Signed and Sealed this

Thirtieth Day of August, 2005

JON W. DUDAS
*Director of the United States Patent and Trademark Office*